United States Patent [19]

Greene et al.

[11] Patent Number: 4,843,205

[45] Date of Patent: Jun. 27, 1989

[54] RESISTANCE WELD JOINING OF HIGH ELECTRICAL CONDUCTIVITY COPPER FOIL

[75] Inventors: Guy S. Greene, Borrego Springs; Francis J. Gojny, Bonita; Paul L. McGrath, Jamul, all of Calif.

[73] Assignee: Rohr Industries, Inc., Chula Vista, Calif.

[21] Appl. No.: 161,181

[22] Filed: Feb. 26, 1988

[51] Int. Cl.4 .............................................. B23K 11/00

[52] U.S. Cl. .............................. 219/78.12; 219/78.11; 219/83

[58] Field of Search .............. 219/78.11, 78.12, 81–84, 219/117.1, 118

[56] References Cited

U.S. PATENT DOCUMENTS 3,163,742 12/1964 Rohr et al. ........................ 219/78.11

4,150,279 4/1979 Metcalfe et al. ...................... 219/83

*Primary Examiner*—E. A. Goldberg

*Assistant Examiner*—Lincoln Donovan

*Attorney, Agent, or Firm*—P. J. Schlesinger; F. D. Gilliam

[57] ABSTRACT

Apparatus and method for welding high electrically conductive metal and metal alloys. High thermal and high electrical conductive metals such as, for example copper foil and the like, normally unweldable by resistance welding means due to their physical makeup, can now be welded in a conventional manner by the use of pairs of welding electrodes constructed of molybdenum.

7 Claims, 1 Drawing Sheet

RESISTANCE WELD JOINING OF HIGH ELECTRICAL CONDUCTIVITY COPPER FOIL

This invention relates generally to apparatus for fabricating honeycomb core and more particularly to a resistance welding system having particular utility for resistance welding copper foil or other high thermally or electrically conductive material when employed in honeycomb core fabricating apparatus such as disclosed in U.S. Pat. Nos. 3,077,533; 3,199,999, 4,462,436 and others.

Although not limited thereto, the welding apparatus of this invention is well suited for use in the machines of the above referenced patents and others relating to resistance welding.

Many manufacturing processes, such as welding, require that several parts be brought together and assembled precisely at the work station; held at the work station in such assembled relation for the duration of the welding period; and then shuttled out of the work area to make way for successive parts to be introduced, assembled, and acted upon within the work station. A situation of this type arises in the fabrication of honeycomb core that is widely used in sandwich construction providing for low weight and high strength aerospace structures. In the fabrication of honeycomb core, strip feed and forming means operate in timed relation cooperating with internesting electrode and indexing pins which serve to move sections of formed metal ribbon or strips into juxtaposed alignment so that the troughs of one strip rest on the crests of another strip preparatory to the welding of the same together. The strips are then held in position while electrode pins and welding wheels pass the welding current through the abutting and juxtaposed nodes of the adjacent crests and troughs to thus weld the same together and form cells of the honeycomb core. When selected crests and troughs have been welded together, the electrode pins and welding members are withdrawn from the thusly formed cells and, following the shuttling of the core by the index pins, re-inserted and re-applied as the process is repeated, as necessary, to complete the core layer by layer.

In general only low electrically conductive copper alloys are practical to resistance weld in the manner herein before discussed due to the destruction or inferior weld of metals constructed of high thermal and electrical conductivity. There has not been a successful method of fabricating honeycomb core from highly thermal or electrically conductive materials until the emergence of this invention.

SUMMARY OF THE INVENTION

In accordance with the improved welding system of this invention the welding electrode pins and wheels are constructed of a molybdenum alloy, such as arc-cast TZM APT-3 plate and ABT-3 bar. The replacement of the wheel and pin electrodes from ones constructed of copper to ones constructed of molybdenum allows honeycomb core material to be constructed automatically on the above referenced shuttle machines from thin copper foil which was not possible until the emergence of this invention. The physical characteristics of molybdenum are such that current may be passed through copper without destruction of the copper foil and molybdenum electrodes and effecting a resistance weld.

The principle object of this invention is to provide apparatus to efficiently resistance weld high thermal and high electrically conductive metal foils.

Another object of this invention is to provide apparatus for resistance welding high thermal and high electrical conductive metal foils on automated honeycomb fabricating machines such as those aforementioned.

Yet another object of this invention is to provide weld wheels and pins of the type mentioned from molybdenum alloys such as arc-cast TZM.

Still other objects, features and advantages of the present invention are those inherent in the novel construction, combination and arrangement of parts comprising the welding system, presently to be described, which has been constructed in accordance with the best mode thus far devised of practicing the principles of the invention, reference being had to the accompanying drawing Figures wherein:

BRIEF DESCRIPTION OF THE DRAWING FIGURES

DETAILED DISCUSSION OF THE PREFERRED EMBODIMENT

Figure 1:
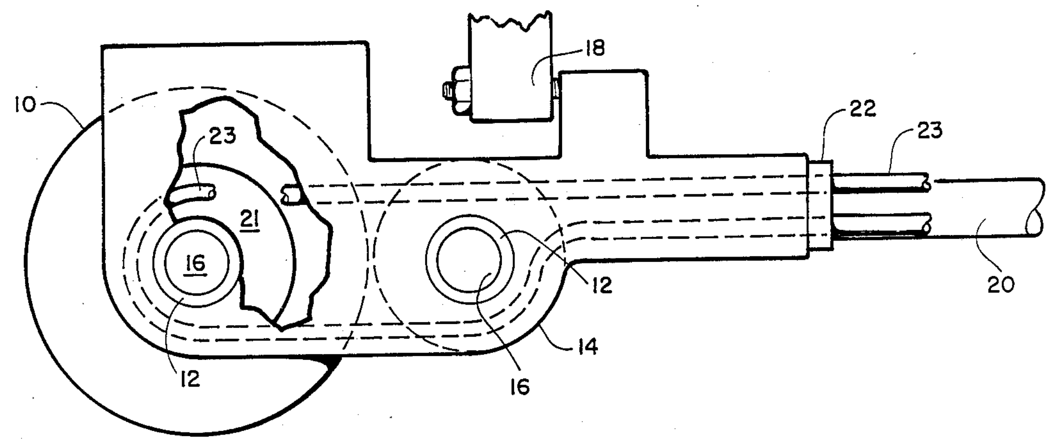
FIG. 1 is a side view showing of a weld wheel and carrier assembly cutaway showing cooling tubes.
Figure 3:
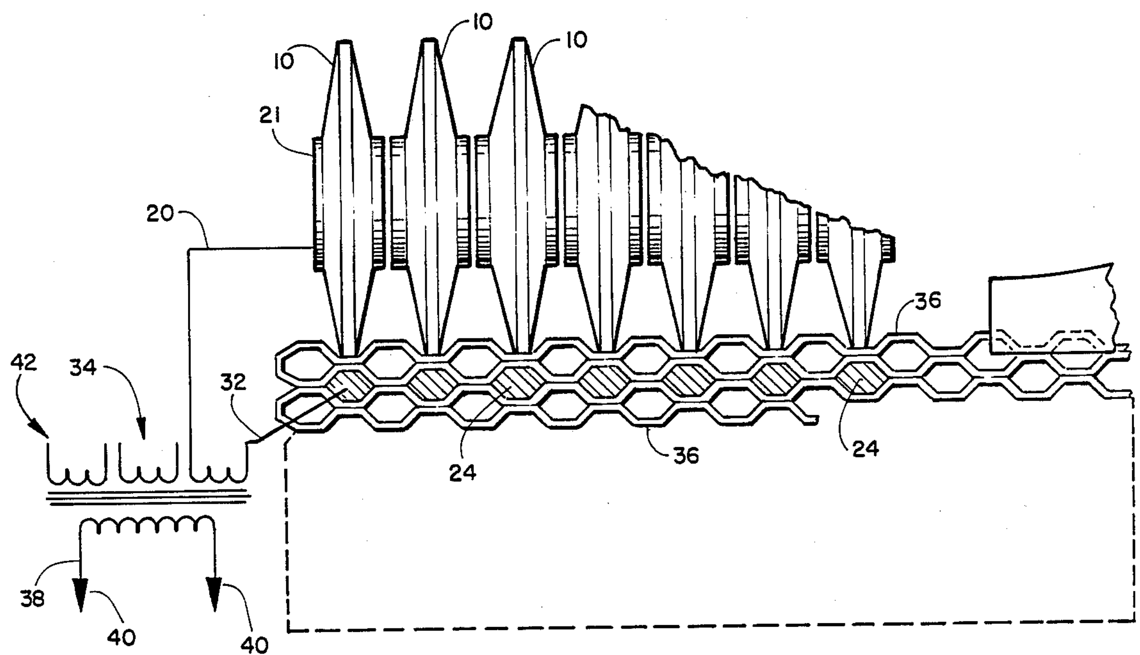
FIG. 3 is a fragmentary view, somewhat enlarged, of a honeycomb core being fabricated with wheel and pin electrodes of the present invention.

Referring now to the drawing Figures and particularly to drawing FIGS. 1 and 3 which depicts a side plan view and an end view respectfully of the weld wheel. The weld wheel is rotatively mounted at location 12 on a pivoted carrier 14 of graphitic tool steel which, in turn, is pivotally mounted by a counter-sunk screw 16 to a vertically disposed support member 18. A transformer lead 20 is connected to the carrier member. The weld wheels 10 are constructed of a molybdenum alloy such as for example arc-cast TZM, APT-3 and ABT-3 bar and bushed by a hub 21 of Class II copper welding electrode alloy. This wheel assembly is joined by a near net fit and silver soldered by a high electrically conductive alloy. The vertically disposed member is preferably formed of a high graphitic steel. It is preferred that the transformer leads be secured, as by high conductive silver solder, directly to the pivot member which, for this purpose, has a terminal portion 22 to which the cable is connected. As shown in FIG. 1 the wheel carrier assembly is attached by silver solder to a brass tube 23 carrying cooling fluid such as, for example, water used to limit the heat build-up caused by the resistance welding of the high thermally conductive copper alloy. More specific details of welder machines that utilize weld wheels of the type described herein which does not form a part of this invention can be found in the above referenced patents and will therefore not be described in any detail herein.

Figure 2:
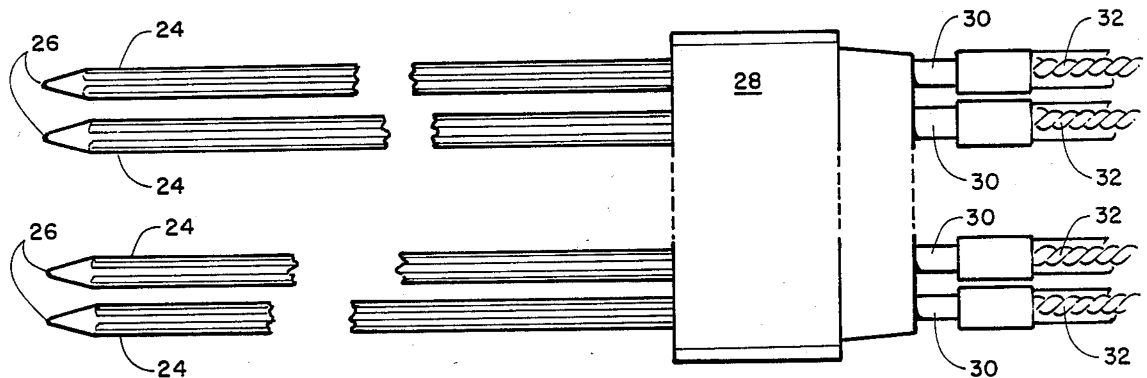
FIG. 2 is a plan view of the electrode pin and assembly.

Referring now to FIG. 2 which depicts a typical showing of electrode pins 24 which are used in the prior art automatic welding machines depicted in the referenced patents. Each of the electrode pins is tapered to a point 26 provide for damage preventive entry as they engage the core material. The pins are held in place by means of a block 28 constructed of a non-electrically conducted such as, for example, potting compound or the like well known in this art. The end 30 of the electrode pin opposite from the pointed end is attached to a cable 32 connected at the weld transformer 34, see FIG. 3.

Referring now again to FIG. 3 which depicts the weld wheels 10 and the electrode pins 24 of this invention. The weld wheels and electrode pins of the invention are shown positioned relative to adjacent strips of formed copper core ribbon 36. The weld transformer 34 is shown having a primary 38 for connection to a power source 40 and a typical secondary 42 with one winding end connected to the weld wheel and the other end connected to a weld pin.

DESCRIPTION OF OPERATION

In use, weld current from the transformer flows from one end of the secondary winding through the weld wheel, through the ribbon at the node of two adjacent strips where the resistance weld is formed and through the pin to the other side of the transformer. It may be seen in FIG. 3 that the formed copper ribbon 36 has flattened troughs and crests which form aligned and abutting nodes of adjacently disposed and oppositely formed ribbon sections with the result that the crests of one section are aligned and abutted with the troughs of the other. Upon passing current between the weld wheels and pins, with the precise application of pressure, the ribbon sections are welded together at the abutting nodes forming generally diamond-shaped cells of square configuration. The section of welded together ribbon is shuttled away from the weld area on a continuous basis as taught by the cited patents thereby forming a resistance welded copper honeycomb core.

It should be undestood that although the discussion herein is directed to the resistance welding of copper ribbon any highly thermally conductive or highly electrically conductive ribbon material can be resistance welded in the manner described above employing the molybdenum electrode pins and weld wheels of this invention.

While the invention here involved has been embodied in a single disclosed form, it will be apparent to those skilled in the art, to which the invention most closely relates or appertains, that the same may be embodied in the forms or carried out in other ways without departing from the spirit or essential characteristics thereof. The present embodiment of the invention is therefore to be considered as in all respects illustrative and not restrictive, the scope of the invention being indicated by the appended claims, and all changes that come within the meaning and range of equivalency of the claims are intended to be embraced therein.

Having thus, described the invention, what is claimed as new and useful and desire to secure by Letters Patent is:

1. Apparatus for resistance welding together thin ribbons of high thermally and high electrically conductive materials comprising:

an energizeable welding transformer having a primary winding connected to a source of electrical energy and a secondary having a terminal at each end thereof, and a pair of weld electrodes, one of said electrodes being a wheel electrode and the other electrode being a pin electrode, each of said electrodes is connected to opposite ends of the secondary winding of said welding transformer, said wheel electrode and said pin electrode are constructed of molybdenum;

whereby a pair of adjacent contacting thin ribbons of highly thermally and electrically conductive material can be resistance welded together by energizing said transformer and applying specific pressure.

2. The invention as defined in claim 1 wherein said wheel electrode is constructed of arc-cast TZM molybdenum alloy.

3. A method of resistance welding together strips of high thermally and electrically conductive thin ribbon material to form a honeycomb core therefrom consisting of the steps of:

selecting a pair of weld electrodes, both of which are formed of molybdenum alloy;

positioning the strips of thin ribbon material tightly between the weld electrodes, and passing current between said electrodes through said thin ribbon material.

4. The invention as defined in claim 1 wherein said wheel electrode comprises a central hub portion and an outer wheel portion, said central hub constructed of copper alloy and said outer wheel portion constructed of molybdenum.

5. The invention as defined in claim 1 further comprising cooling means for cooling said wheel electrodes.

6. The invention as defined in claim 3 further comprising the step of cooling said weld electrodes.

7. A welded product formed from the method of claim 3.

* * * * *